US006031468A

United States Patent [19]

Tsao et al.

[11] Patent Number: 6,031,468

[45] Date of Patent: Feb. 29, 2000

[54] WARNING LIGHT ADAPTED FOR USE WITH A STOP SIGN

[75] Inventors: Grant Tsao, Rowland Heights, Calif.; Johnson Weng, Taipei Hsien, Taiwan

[73] Assignee: Chinotech International, Inc., Walnut, Calif.

[21] Appl. No.: 09/217,024

[22] Filed: Dec. 21, 1998

[51] Int. Cl.[7] .................................................. B60Q 7/00

[52] U.S. Cl. ....................... 340/908; 340/332; 340/908.1; 340/439; 340/321; 362/183; 362/157; 40/572; 40/586; 40/610

[58] Field of Search .................................. 340/908, 332, 340/908.1, 439; 362/183, 157; 40/610, 572, 586

[56] References Cited

U.S. PATENT DOCUMENTS

| | | | |
|---|---|---|---|
| 4,751,622 | 6/1988 | Williams | 362/183 |
| 5,023,607 | 6/1991 | Staten | 340/908.1 |
| 5,262,756 | 11/1993 | Chien | 340/332 |
| 5,276,424 | 1/1994 | Hegemann | 340/321 |
| 5,453,729 | 9/1995 | Chu | 340/332 |
| 5,469,157 | 11/1995 | Carpenter et al. | 340/908.1 |
| 5,542,203 | 8/1996 | Luoma et al. | 40/610 |
| 5,664,874 | 9/1997 | Winterer | 362/191 |
| 5,687,500 | 11/1997 | Lamparter | 40/572 |
| 5,694,711 | 12/1997 | Cowgill et al. | 40/610 |
| 5,735,492 | 4/1998 | Pace | 246/125 |
| 5,755,051 | 5/1998 | Zumbuhl | 40/586 |

*Primary Examiner*—Daniel J. Wu
*Assistant Examiner*—Tai T. Nguyen
*Attorney, Agent, or Firm*—Raymond Sun

[57] ABSTRACT

A warning light is provided to be coupled to a stop sign. The warning light includes a main unit, a holder for cooperating with the main unit to couple to the stop sign, a solar cell for converting solar energy into electrical energy, a light emitting element disposed in the main unit, an energy storage device coupled to the solar cell for storing the electrical energy, and a charge control circuit coupled to the solar cell, energy storage device and light emitting element. The charge control circuit selectively directs electrical energy from the solar cell to energy storage device, or from the energy storage device to the light emitting element.

19 Claims, 3 Drawing Sheets

WARNING LIGHT ADAPTED FOR USE WITH A STOP SIGN

BACKGROUND OF THE INVENTION

1. Field of the Invention

The present invention relates to warning lights, and in particular, to a blinking warning light adapted to be coupled to a stop sign.

2. Description of the Prior Art

An important consideration for city planners, and in particular, traffic safety officials, is the safety of drivers and pedestrians. A common cause of recurring traffic accidents at intersections that are governed by stop signs is the poor visibility of stop signs. Unlike signal lights that are highly visible, the visibility of stop signs rely solely on the bright red paint of the sign that contrasts with white lettering for the word "STOP". As a result, the visibility of stop signs is usually the poorest at dusk or at night when visibility is near zero. Moreover, branches from trees and shrubs, or other obstacles, can partially block a portion of a stop sign. If a driver does not see a stop sign, then he or she will likely run the sign, thereby greatly increasing the risk of an accident in the intersection.

In addition, many accidents occur at two-way stop signs (i.e., where cross-traffic does not have to stop) where a driver assumes that the intersection is a four-way stop.

Consequently, there remains a need to improve traffic safety at intersections controlled by stop signs, and in particular, to improve the visibility of the stop signs.

SUMMARY OF THE DISCLOSURE

It is an object of the present invention to improve traffic safety at intersections controlled by stop signs.

It is another object of the present invention to improve the visibility of the stop signs.

It is yet another object of the present invention to provide a warning light assembly that provides a sufficiently bright light to alert drivers of a stop sign during the evening or darkness.

In order to accomplish the objects of the present invention, a warning light is coupled to a stop sign. The warning light of the present invention includes a main unit, a holder for cooperating with the main unit to couple to the stop sign, a solar cell for converting solar energy into electrical energy, a light emitting element disposed in the main unit, an energy storage device coupled to the solar cell for storing the electrical energy, and a charge control circuit coupled to the solar cell, energy storage device and light emitting element. The charge control circuit selectively directs electrical energy from the solar cell to energy storage device, or from the energy storage device to the light emitting element.

In one embodiment of the present invention, the main unit can include a set of rails, and the holder can include a set of lips corresponding to the set of rails, with the set of lips slideably inserted into the set of rails to couple the holder to the main unit. The set of rails can have a first plurality of teeth, and the set of lips can have a second plurality of teeth, with the first and second plurality of teeth engaging each other to allow slidable movement in the first direction but preventing slidable movement in a direction opposite the first direction. This prevents the holder from being removed from the main unit, thereby discouraging theft of the warning light.

In one embodiment of the present invention, the charge control circuit includes a constant voltage circuit coupled to the solar cell for maintaining the electrical energy received from the solar cell at a constant voltage. The charge control circuit can also include a control circuit coupled to the solar cell, energy storage device and light emitting element.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
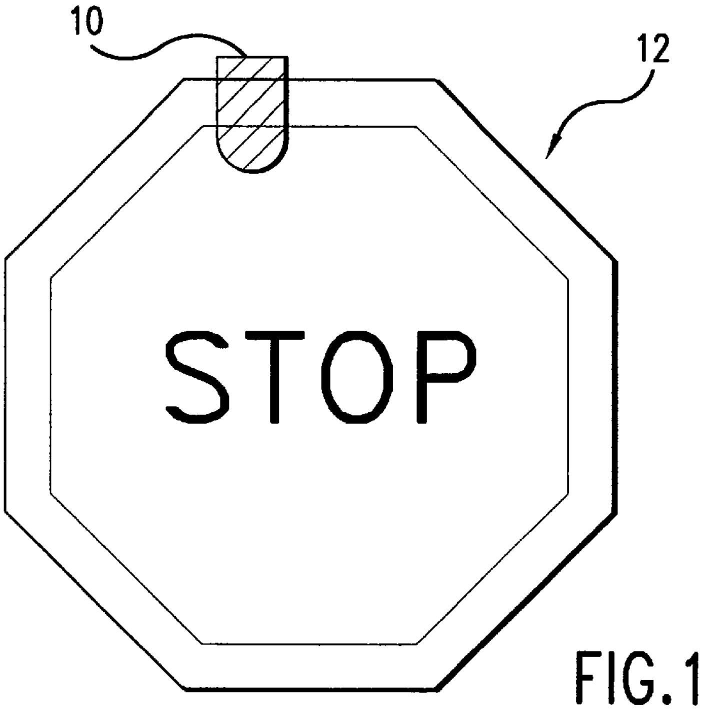
FIG. 1 is a front view of a stop sign having a warning light assembly of the present invention coupled thereto.

FIG. 1 is a perspective view illustrating a warning light assembly 10 according to a first embodiment of the present invention coupled to a stop sign 12. The warning light assembly 10 can be clipped or otherwise non-removably attached to the stop sign 12. For example, the warning light assembly 10 can be clipped along the top edge of the stop sign 12 or on the right or left upper slanted edges, depending on how the stop sign 12 is mounted.

Figure 2A:
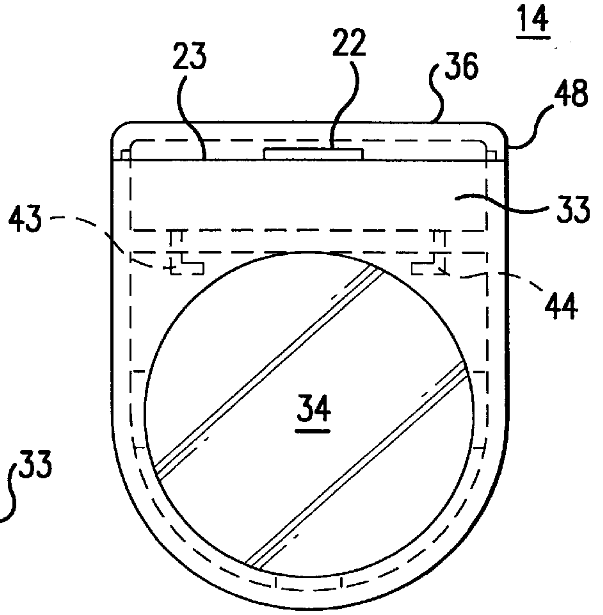
FIG. 2A is a front view of the main unit of the warning light assembly according to a first preferred embodiment of the present invention.
Figure 2B:
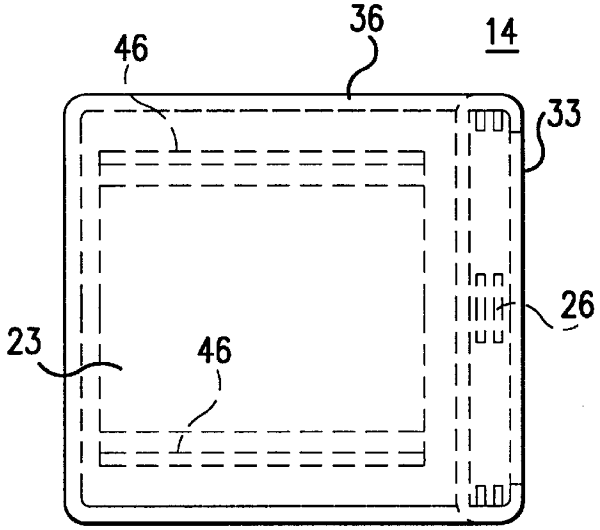
FIG. 2B is a top view of the main unit of FIG. 2A.
Figure 2C:
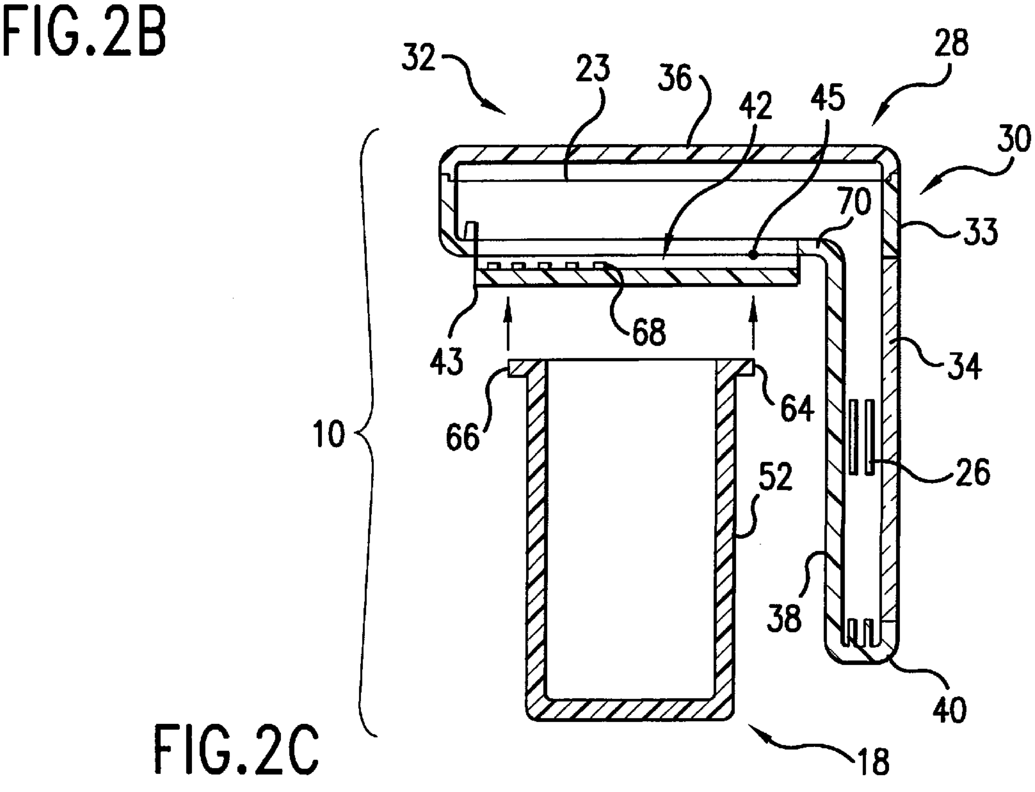
FIG. 2C is a cross sectional side view of the main unit of FIG. 2A.
Figure 3A:
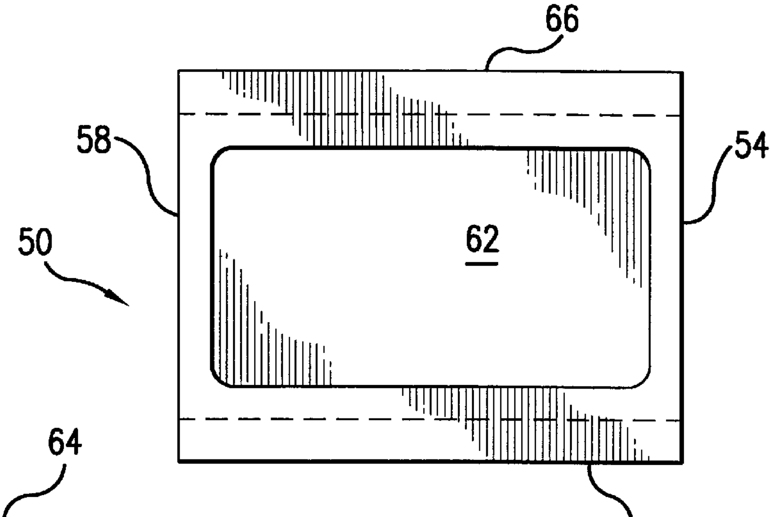
FIG. 3A is a top view of the solar energy storage holder of the warning light assembly according to a first preferred embodiment of the present invention.
Figure 3B:
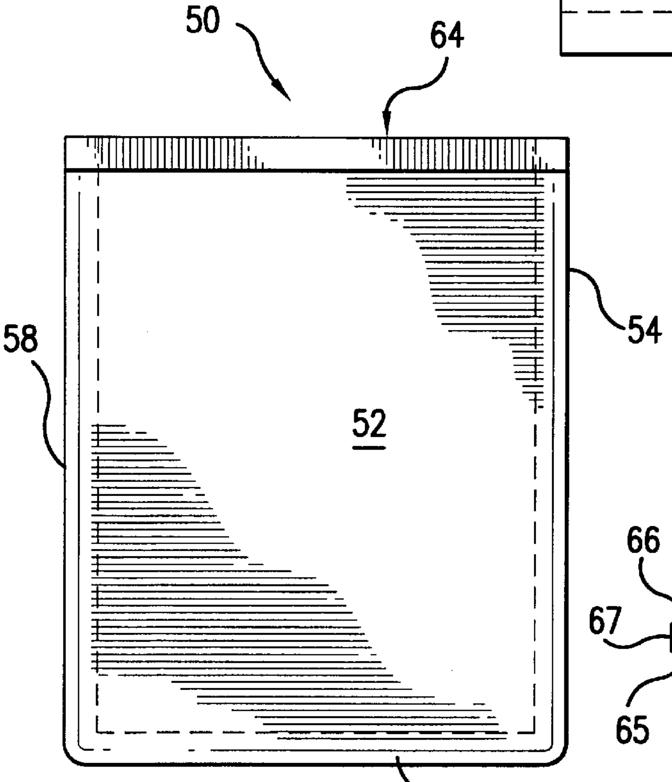
FIG. 3B is a side view of the holder of FIG. 3A.
Figure 3C:
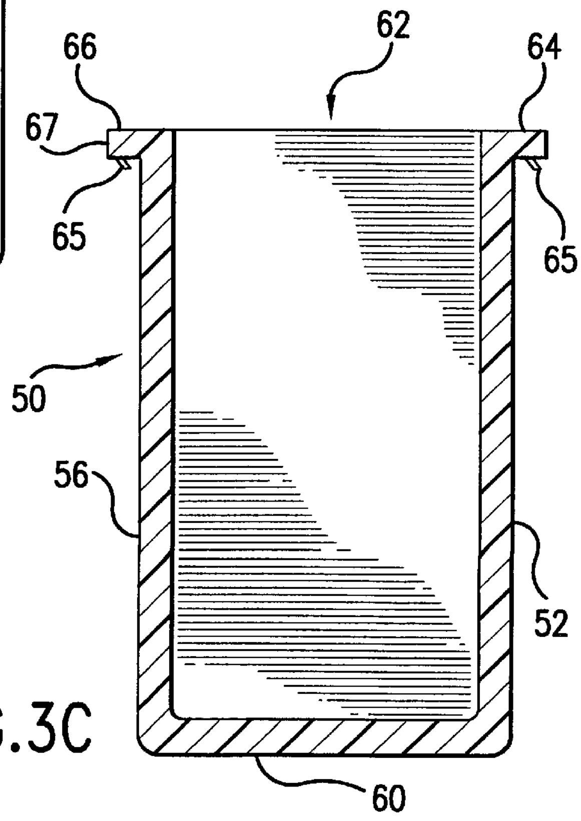
FIG. 3C is a cross sectional view of the holder of FIG. 3A.

Referring now to FIGS. 2A–2C, the warning light assembly 10 includes a main unit 14 and a detachable solar energy storage holder 18 that cooperate together to attach to a stop sign 12. The main unit 14 houses a solar cell 22 that extracts solar energy. The solar cell 22 can be provided on a top side of a printed circuit board (PCB) 23, with the charging circuit 24 of FIG. 4 and other circuitry bonded on the bottom side of the PCB 23. The extracted solar energy is provided to the charging circuit 24 and then subsequently to an energy storage unit 25 that is positioned in the holder 18. The energy storage unit 25 collects and stores the energy, and provides the energy to power one or more light emitters 26 that produce the warning light.

The main unit 14 is provided with an L-shaped housing 28 having a front portion 30 and a top portion 32. The front portion 30 has a front wall 33 for positioning a diffuser 34 that covers the light emitter 26 and that operates to increase the brightness and visibility of the light emitted from the light emitter 26. The diffuser 34 can be a plastic lens that is provided in a color that is effective in diffusing and increasing the brightnes of light. Since the stop sign is red, in a preferred embodiment, a red diffuser 34 is provided to make the stop sign more visible. The light emitter 26 is secured to a rear wall 38 and is positioned at about the center of the front portion 30 and at about the center of the diffuser 34.

The top portion 32 has a generally transparent top wall 36 which covers the solar cell 22. The top wall 36 and the front wall 33 are connected to each other to form the L-shaped configuration of the housing 28. The rear wall 38 and a bottom wall 40 cooperate with the front wall 33 to complete the enclosure for the front portion 30 of the housing 28. The interior of the top portion 32 also includes a pair of brackets 46 provided in the side walls 48 of the top portion 32 for supporting the PCB 23. A connector 42 is provided in the bottom of the top portion 32 opposite the top wall 36, at a location spaced apart from the rear wall 38 of the front portion 30. The connector 42 is defined by a pair of opposing rails 43 and 44, with each rail having a plurality of teeth 68.

Referring now to FIGS. 3A–3C and 2C, the holder 18 has a generally rectangular housing 50 enclosed by four side walls 52, 54, 56, 58 and a bottom wall 60, while defining an opening 62 at the top. The opening 62 communicates with the interior of the top portion 32 via the opening in the connector 42. The energy storage unit 25 is retained inside the holder 18, as explained below. opposing lips 64 and 66 extend from the top of the opposing right and left walls 52 and 56, respectively. The lips 64 and 66 can be inserted inside the rails 43, 44 of the connector 42 to couple the holder 18 to the main unit 14.

In one embodiment, the lips 64 and 66 can be adapted to engage the rails 43, 44 to form a one-way connection. Specifically, angled teeth 65 can be provided on the bottom edges of the lips 64, 66 and adapted to engage the teeth 68 of the connector 42 in a manner that only allows the lips 64 and 66 to be inserted into the rails 43, 44 of the connector 42 in a first direction to couple the holder 18 to the main unit 14, but which prevents the holder 18 from being withdrawn in a second direction opposite the first direction. Withdrawing the holder 18 in the second direction would break the teeth 65 and lips 64, 66, thereby discouraging theft of the warning light assembly 10, since the holder 18 can no longer be secured to the connector 42, rendering the warning light assembly 10 useless.

Referring now to FIGS. 1 and 2C, the warning light assembly 10 can be installed on a stop sign 12 in the following manner. The warning light assembly 10 is provided in two pieces: the main unit 14 and the holder 18. The main unit 14 is placed against the stop sign 12 in a manner such that the portion 70 of the bottom of the top portion 32 that is adjacent the rear wall 38 and the connector 42 contacts, or is adjacent, the edge of the stop sign 12 that the warning light assembly 10 is to be secured to. The lips 64 and 66 of the holder 18 are then inserted into the rails 43, 44 of the connector 42 in a direction from the rear of the top portion 32 towards the front of the top portion 32, and secured to the main unit 14. Thus, the stop sign 12 is sandwiched between the front wall 58 of the holder 18 and the rear wall 38 of the front portion 30, so as to secure the warning light assembly 10 to the stop sign 12.

Figure 4:
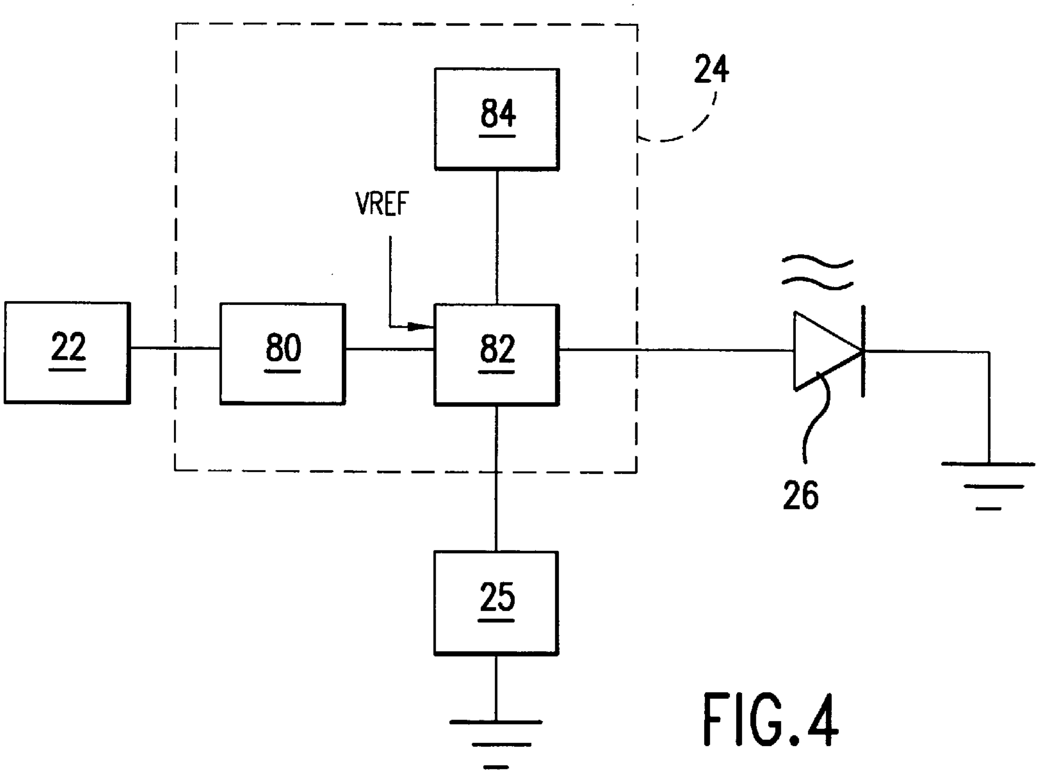
FIG. 4 is a simple block diagram illustrating the electronic components utilized by the warning light assembly of the present invention.

FIG. 4 is a simple block diagram illustrating the electronic components of the warning light assembly 10 of the present invention. The solar cell 22 converts solar energy into electrical energy. The charging circuit 24 is coupled to the solar cell 22 and either charges the electrical energy storage unit 25 with electrical energy from the solar cell 22, or provides electrical energy to operate the light emitter 26. The charging circuit 24 can also provide regulation of the power from the solar cell 22 thereby maintaining the intensity of the light emitted from the light emitter 26 at a particular level or decreasing the intensity of the light emitted from the light emitter 26 depending on the amount of energy remaining.

According to a preferred embodiment, the light emitter 26 can be a super-bright light-emitting diode (LED), and the energy storage unit 25 can be a special 100 F Gold capacitor having a value greater than 50 Farads, which is available from Elna Company of Japan. The average life of the Gold capacitor is three to four years, thereby ensuring a long period of use for the warning light assembly 10. The energy storage unit 25 can be positioned inside the space defined by the walls 52, 54, 56, 58, 60 of the holder 18. Contacts can be provided on one or more of the walls 52, 54, 56, 58, 60 to electrically couple the energy storage unit 25 to the holder 18, and additional contacts (e.g., 67) can be provided on the lips 64, 66 to electrically couple contacts (e.g., 45) provided along the rails 43, 44. These contacts 45 and 67 between the lips 64, 66 and rails 43, 44 electrically couple the energy storage unit 25 to the PCB 23, and subsequently to charging circuit 24, solar cell 22, and light emitter 26 in the main unit 14.

A lesser but possible alternative is to provide the energy storage unit 25 in the form of a regular battery. However, since a battery has a limited life (e.g., a couple of days or weeks), this is not a very desirable option because of the heavy maintenance costs involved. Another lesser alternative is to provide the energy storage unit 25 in the form of a rechargeable battery. However, because of the memory effect of rechargeable batteries, a mechanism must be in place to ensure that the battery is completely drained before recharging the same, to prevent the life of the battery from being greatly shortened.

The charging circuit 24 has a constant voltage circuit 80 that is coupled to the solar cell 22, and a control circuit 82 that is coupled to the constant voltage circuit 80, the energy storage unit 25, the light emitter 26, and a photocell 84. The constant voltage circuit 80 maintains the charging circuit 24 at a constant voltage of 2.5 V since the Gold capacitor 25 needs to be charged at a constant voltage. Specifically, the constant voltage circuit 80 maintains the energy received from solar cell 22 at a constant voltage. The control circuit 82 functions to control the operations of the warning light assembly 10. The photocell 84 detects the presence of brightness and darkness outside in the environment, as explained below.

In operation, the assembly 10 first determines whether it is day or night (i.e., bright or dark). This can be done by the control circuit 82 processing the signals (if any) received by photocell 84, or detecting the amount of current generated by the solar cell 22. When detecting the amount of current generated by solar cell 22, a determination can made by a comparator in the control circuit 82 coupled to a reference voltage source as to whether the solar current is greater than a predetermined threshold VREF.

If it is day (i.e., the environment is not dark), then the control circuit 82 directs current from the solar cell 22 to charge the energy storage unit 25. If it is night (i.e., the environment is dark), the control circuit 82 directs energy from the energy storage unit 25 to the light emitter 26 to activate the light emitter 26. When activated, the light emitter 26 preferably blinks at a predetermined frequency (e.g., blink once every two seconds). The blinking is preferred since it will minimize the amount of energy that is needed to activate the light emitter 26 over an extended period of time. This blinking can also be controlled by the control circuit 82.

The control circuit 82 can be programmed to check for day or night after regular intervals (e.g., 15 minutes). When the control circuit 82 detects daylight after a period of relative darkness, the control circuit 82 turns off the light emitter 26 and again directs the solar current to charge the energy storage unit 25.

As an alternative, the present invention can employ a light resistor (also known as "CDS") to activate and de-activate the light emitter 26. The use of a CDS will require a simpler control circuit 82.

Thus, the warning light assembly 10 is effective for use at night, when the stop sign 12 is least likely to be visible. In this regard, the solar cell 22 and charging circuitry 24 will charge the energy storage unit 25 during the day when sunlight is available. The energy that has been stored by the energy storage unit 25 is then used to power the light emitter 26 when there is insufficient environmental light, such as during dawm, dusk, and night. Since a typical day provides about ten hours of daylight, the energy storage unit 25 can be charged with sufficient electrical energy to power the light emitter 26 for up to eight to twelve hours of use during the non-daylight hours.

In addition, the warning light assembly 10 is easily and quickly installed. The use of solar energy to power the light emitters 26 obviates the use of batteries (and the problems associated therewith) and virtually eliminates all maintenance, since the warning light assembly 10 can operate self-sufficiently without any service, repair, or modification.

While the description above refers to particular embodiments of the present invention, it will be understood that many modifications may be made without departing from the spirit thereof. The accompanying claims are intended to cover such modifications as would fall within the true scope and spirit of the present invention. As a non-limiting example, it is possible to provide the energy storage unit 25 inside the main unit 14 so that the holder 18 only functions to secure the main unit 14 against an edge of a stop sign. In such an embodiment, the energy storage unit 25 can be electrically coupled to the PCB 23.

What is claimed is:

1. A warning light, and a stop sign having a first surface and a second surface, the warning light comprising:

- a main unit having a first grip surface adjacent to the first surface of the stop sign;
- a holder having a second grip surface adjacent to the second surface of the stop sign, said first grip surface cooperating with the second grip surface to couple the main unit and the holder to the stop sign;
- a solar cell for converting solar energy into electrical energy;
- a light emitting element disposed in the main unit;
- an energy storage device coupled to the solar cell for storing the electrical energy; and
- a charge control circuit coupled to the solar cell, energy storage device and light emitting element, the charge control circuit selectively directing electrical energy from the solar cell to the energy storage device, or from the energy storage device to the light emitting element.

2. A warning light, adapted to be coupled to a stop sign, comprising:

- a main unit having a set of rails;
- a holder for cooperating with the main unit to couple to the stop sign, the holder including a set of lips corresponding to the set of rails, and wherein the set of lips are slideably inserted into the set of rails to couple the holder to the main unit;
- a solar cell for converting solar energy into electrical energy;
- a light emitting element disposed in the main unit;
- an energy storage device coupled to the solar cell for storing the electrical energy; and
- a charge control circuit coupled to the solar cell, energy storage device and light emitting element.

3. The warning light of claim 2, wherein the set of rails has a first plurality of teeth, and wherein the set of lips has a second plurality of teeth, with the first and second plurality of teeth engaging each other to allow slidable movement in the first direction but preventing slidable movement in a direction opposite the first direction.

4. The warning light of claim 1, wherein the energy storage device is a Gold capacitor.

5. The warning light of claim 1, wherein the Gold capacitor has a value greater than 50 Farads.

6. The warning light of claim 1, wherein the light emitting element is a light emitting diode (LED).

7. The warning light of claim 6, wherein the LED is a super-bright LED.

8. The warning light of claim 1, wherein the charge control circuit includes a constant voltage circuit coupled to the solar cell for maintaining the electrical energy received from the solar cell at a constant voltage.

9. The warning light of claim 8, wherein the charging circuit further includes a photocell for determining day and night.

10. The warning light of claim 8, wherein the charge control circuit further includes a control circuit coupled to the solar cell, energy storage device and light emitting element.

11. The warning light of claim 10, wherein the control circuit measures a current provided by the solar cell, compares the measured current with a predetermined threshold, and based thereon, selectively directs electrical energy from the solar cell to energy storage device, or from the energy storage device to the light emitting element.

12. The warning light of claim 1, wherein the solar cell is positioned in the main unit.

13. The warning light of claim 1, wherein the energy storage unit is retained in the holder.

14. The warning light of claim 1, further including an attachment mechanism for coupling the main unit to the holder.

15. A method of improving the visibility of a stop sign having a first surface and a second surface, comprising:

(a) providing a warning light comprising:
- a main unit having a first grip surface;
- a holder having a second grip surface;
- a solar cell for converting solar energy into electrical energy;
- a light emitting element disposed in the main unit; and
- an energy storage device coupled to the solar cell for storing the electrical energy;

(b) placing the first grip surface adjacent to the first surface of the stop sign and placing the second grip surface adjacent to the second surface of the stope sign, so that the first grip surface and the second grip surface cooperate to secure the warning light to a stop sign;

(c) receiving solar energy and directing the converted electrical energy to the energy storage device during day; and (d) directing the electrical energy stored in the energy storage device to the light emitting element during darkness.

16. The method of claim 15, wherein steps (c) and (d) are performed by selectively directing electrical energy from the solar cell to energy storage device, or from the energy storage device to the light emitting element.

17. The method of claim 15, wherein step (b) includes the step of providing a one-way connection between the main unit and the holder.

18. The method of claim 15, further including maintaining the electrical energy at a constant voltage.

19. A warning light, and a stop sign, the warning light comprising:

a main unit;

a holder;

a solar cell for converting solar energy into electrical energy;

a light emitting element disposed in the main unit;

an energy storage device coupled to the solar cell for storing the electrical energy; and a charge control circuit coupled to the solar cell, energy storage device and light emitting element, the charge control circuit selectively directing electrical energy from the solar cell to the energy storage device, or from the energy storage device to the light emitting element;

with the stop sign sandwiched between the holder and the main unit to couple to the stop sign to the warning light.

* * * * *